(12) United States Patent
Subbakrishna et al.

(10) Patent No.: US 8,589,908 B2
(45) Date of Patent: Nov. 19, 2013

(54) METHOD FOR REMOTELY UPGRADING THE FIRMWARE OF A TARGET DEVICE USING WIRELESS TECHNOLOGY

(75) Inventors: Sriharsha Mysore Subbakrishna, Bangalore (IN); Naresh Kumar Gupta, Delhi (IN); Mohan Kashivasi, Kamataka (IN)

(73) Assignee: St-Ericsson SA, Plan-les-Ouates (CH)

( * ) Notice: Subject to any disclaimer, the term of this patent is extended or adjusted under 35 U.S.C. 154(b) by 1189 days.

(21) Appl. No.: 11/606,644

(22) Filed: Nov. 29, 2006

(65) Prior Publication Data

US 2008/0040713 A1 Feb. 14, 2008

Related U.S. Application Data

(63) Continuation-in-part of application No. PCT/IN2005/000179, filed on May 31, 2005.

(30) Foreign Application Priority Data

May 31, 2004 (IN) .............................. 993/DEL/2004

(51) Int. Cl.
*G06F 9/445* (2006.01)

(52) U.S. Cl.
USPC ........... 717/173; 717/171; 717/172; 717/178; 711/142

(58) Field of Classification Search
None
See application file for complete search history.

(56) References Cited

U.S. PATENT DOCUMENTS

| | | | | |
|---|---|---|---|---|
| 5,206,863 A * | 4/1993 | Nazarenko et al. | ........... | 714/752 |
| 5,550,997 A * | 8/1996 | Ip et al. | ........... | 711/103 |
| 5,594,903 A * | 1/1997 | Bunnell et al. | ........... | 717/162 |
| 5,649,187 A * | 7/1997 | Hornbuckle | ........... | 1/1 |
| 5,673,385 A * | 9/1997 | Mack et al. | ........... | 714/44 |
| 5,784,611 A * | 7/1998 | Thantrakul | ........... | 713/1 |
| 5,815,722 A * | 9/1998 | Kalwitz et al. | ........... | 717/178 |
| 5,949,772 A * | 9/1999 | Sugikawa et al. | ........... | 370/331 |
| 6,047,304 A * | 4/2000 | Ladwig et al. | ........... | 708/530 |
| 6,052,753 A * | 4/2000 | Doerenberg et al. | ........... | 710/305 |
| 6,198,705 B1 * | 3/2001 | Tran et al. | ........... | 369/32.01 |
| 6,263,452 B1 * | 7/2001 | Jewett et al. | ........... | 714/5.11 |

(Continued)

FOREIGN PATENT DOCUMENTS

WO WO 01/04749 A 1/2001

OTHER PUBLICATIONS

Non Volatile Memories: Issues, Challenges and Trends for the 2000's Scenario, author: Cresenza et al, source: IEEE, dated: 1996.*

(Continued)

*Primary Examiner* — Chameli Das
(74) *Attorney, Agent, or Firm* — Coats and Bennett, P.L.L.C.

(57) ABSTRACT

An embodiment of the present invention provides a system and method for remotely upgrading the firmware of a target device using wireless technology from the Bluetooth-enabled PC or Laptop to another Bluetooth device e.g., mouse, Keyboard, headset, mobile phone etc. Existing solutions either may not have upgrade capabilities, or may require the use of proprietary cables. An embodiment of the solution proposed here extends the "Connecting without cables" concept of Bluetooth to firmware upgrades. The system comprises a host device for sending the firmware required for upgradation; and a target device containing a first code and a second code wherein said first code identifies details of the firmware; and said second code identifies the completion of the download operation when the firmware is successfully downloaded.

6 Claims, 4 Drawing Sheets

(56) References Cited

U.S. PATENT DOCUMENTS

| | | | |
|---|---|---|---|
| 6,281,929 B1* | 8/2001 | Fimoff | 348/180 |
| 6,425,122 B1* | 7/2002 | Klingman | 717/124 |
| 6,467,003 B1* | 10/2002 | Doerenberg et al. | 710/117 |
| 6,467,087 B1* | 10/2002 | Yang | 717/168 |
| 6,473,832 B1* | 10/2002 | Ramagopal et al. | 711/118 |
| 6,748,116 B1* | 6/2004 | Yue | 382/238 |
| 6,928,108 B2* | 8/2005 | Nelson et al. | 375/222 |
| 6,934,873 B2* | 8/2005 | Lu et al. | 714/2 |
| 7,069,452 B1* | 6/2006 | Hind et al. | 713/1 |
| 7,293,203 B1* | 11/2007 | Coatney et al. | 714/42 |
| 7,318,172 B2* | 1/2008 | Lou | 714/25 |
| 7,409,539 B2* | 8/2008 | Arnez et al. | 713/100 |
| 7,480,907 B1* | 1/2009 | Marolia et al. | 717/174 |
| 7,774,820 B2* | 8/2010 | Prus et al. | 725/132 |
| 8,160,089 B1* | 4/2012 | Padiyar et al. | 370/445 |
| 8,407,526 B1* | 3/2013 | Righi et al. | 714/38.1 |
| 2003/0110484 A1* | 6/2003 | Famolari | 717/173 |
| 2003/0217193 A1* | 11/2003 | Thurston et al. | 709/321 |
| 2003/0217358 A1* | 11/2003 | Thurston et al. | 717/174 |
| 2004/0015952 A1* | 1/2004 | Lajoie et al. | 717/171 |
| 2004/0107416 A1* | 6/2004 | Buban et al. | 717/170 |
| 2004/0199897 A1* | 10/2004 | Ghercioiu et al. | 717/101 |
| 2004/0240423 A1* | 12/2004 | Anttila | 370/349 |
| 2004/0243991 A1* | 12/2004 | Gustafson et al. | 717/168 |
| 2004/0254013 A1* | 12/2004 | Quraishi et al. | 463/29 |
| 2004/0254014 A1* | 12/2004 | Quraishi et al. | 463/29 |
| 2005/0055684 A1* | 3/2005 | Rao et al. | 717/168 |
| 2005/0064859 A1* | 3/2005 | Kotzin et al. | 455/419 |
| 2005/0081080 A1* | 4/2005 | Bender et al. | 714/2 |
| 2005/0144651 A1* | 6/2005 | Prus et al. | 725/134 |
| 2005/0160217 A1* | 7/2005 | Gonzalez et al. | 711/6 |
| 2005/0246701 A1* | 11/2005 | Kanapathipillai et al. | 717/168 |
| 2006/0092323 A1* | 5/2006 | Feeler et al. | 348/553 |
| 2006/0136899 A1* | 6/2006 | Yoo | 717/168 |
| 2007/0033387 A1* | 2/2007 | Arnez et al. | 713/1 |
| 2007/0100936 A1* | 5/2007 | Lum | 709/203 |
| 2007/0207800 A1* | 9/2007 | Daley et al. | 455/425 |
| 2007/0271389 A1* | 11/2007 | Joshi et al. | 709/231 |
| 2007/0294385 A1* | 12/2007 | Kapadekar et al. | 709/223 |
| 2008/0270805 A1* | 10/2008 | Kean | 713/189 |
| 2009/0063696 A1* | 3/2009 | Wang et al. | 709/232 |
| 2009/0113121 A1* | 4/2009 | Lee et al. | 711/103 |
| 2011/0047123 A1* | 2/2011 | Herrera et al. | 706/59 |

OTHER PUBLICATIONS

Reliability issues related to Fast Charge Loss Mechanism in Embedded Non Volatile Memories, author: Mora et al, source: IEEE, dated: 2006.*

Anonymous, "Universal Serial Bus Device Class Specification for Device Firmware Upgrade", Internet Article, 'Online! May 13, 1999, pp. 1-44, XP002340379.

Main A, "Care and Feeding of Magic Numbers", IETF Standard-Working-Draft, Internet Engineering Task Force, IETF, CH, Oct. 2001, pp. 1-13, XP015031943.

International Search Report for PCT/IN2005/000179 dated Aug. 22, 2005.

* cited by examiner

METHOD FOR REMOTELY UPGRADING THE FIRMWARE OF A TARGET DEVICE USING WIRELESS TECHNOLOGY

PRIORITY CLAIM

This is a continuation-in-part application which claims priority from PCT/IN05/00179, published in English, filed May 31, 2005, which claims priority from Indian patent Application No. 993/Del/2004, filed May 31, 2004, which are incorporated herein by reference.

TECHNICAL FIELD

An embodiment of the invention relates to a method and system for remotely upgrading the firmware of a target device. More particularly, it provides a mechanism to download firmware over the air via Bluetooth short-range wireless technology from the Bluetooth-enabled PC or Laptop to another Bluetooth device, e.g., mouse, keyboard, headset and the like.

BACKGROUND

Bluetooth technology is a cutting-edge open specification that enables short-range wireless connections between electronic devices like desktops, notebook computers, handheld devices, personal digital assistants, mobile phones, camera phones, printers, digital cameras, headsets, mouse and keyboards. Bluetooth wireless technology uses a globally available frequency band (2.4 GHz) for worldwide compatibility. In a nutshell, Bluetooth technology unplugs the digital peripherals and makes cable clutter a thing of the past. With Bluetooth technology integrated in the devices, one can easily connect the computer with other devices wirelessly, within a 30-foot range.

Quite a few wireless (and in fact wired) devices available today do not have any upgrade mechanism. This makes their software obsolete after some time even when the hardware has capabilities to support the new software features. Once the Non Volatile Memory (NVM) on such a device is written, it cannot be rewritten. Thus the bug fixes or patches of the software cannot be passed on the customer after the device has left the production facility.

Some devices do support upgrade mechanism by using UART, USB, Ethernet transport mechanisms or PCMCIA cards. These mechanisms tend to increase the cost of the device. Also, connecting these devices correctly to upgrade them may not be easy for the end users. The cost of connecting the devices may be high, and the process may be tedious Bluetooth is a convenient and reliable technology that has wireless connectivity at speeds close to 1 Mbps. As a new technology for wireless connectivity, Bluetooth technology cuts the wires that are used to tie up digital devices. Based on a low-cost, short-range radio link, Bluetooth technology can connect many types of digital devices without a single cable in sight, giving more freedom to roam, thereby providing better mobility. Bluetooth supports connection of several target devices to a single host device.

Bluetooth wireless technology has already become a global de facto standard for wireless connectivity. In the future, Bluetooth technology is likely to be a standard in tens of millions of mobile phones, PCs, laptops, and a whole range of other electronic devices. As a result, the market may demand new innovative applications, value-added services, and end-to-end solutions.

A single transceiver, such as the one offered in Wireless Bluetooth Desktop, can communicate with up to seven compatible Bluetooth devices simultaneously, eliminating multiple device cables. It is industry-supported, standardized wireless protocol that provides compatibility today and most likely in the future. It has a longer range than other wireless technologies: up to 30 feet (9.1 meters) from the transceiver to the Bluetooth device. Also it has application specific protocol designs called Bluetooth profiles with built in security features.

SUMMARY

Nowadays, more and more devices are Bluetooth enabled. This download protocol may prove to be very effective to provide software upgrades and patches to the end users. A few user scenarios of such devices are described below:

Smart home, in which the speakers are connected to the TV and the music system wirelessly.

Bluetooth enabled digital camera can send still or video images from any location to any location without the hassle of connecting the camera to the mobile phone or the wire line phone.

Connection of the PC or notebook to printers, scanners and faxes without ugly and troublesome cable attachments.

The user can increase the freedom by connecting the mouse or the keyboard wirelessly to the computer.

Connect the wireless headset to mobile phone, mobile computer or any wired connection to keep the hands free for more important tasks when one is in the office or in the car.

In meetings and conferences one can transfer selected documents instantly with selected participants, and exchange electronic business cards automatically, without any wired connections.

Therefore it is desired to devise a mechanism to upgrade firmware of wireless devices, including Bluetooth enabled devices, via PC or Laptop in a user-friendly manner.

An embodiment of the invention provides a method and system for remotely upgrading the firmware of a target device, resulting in cost effective and power saving upgradation.

Another embodiment of the invention eliminates the need for a hardware switch/jumper and the like to switch the device to download mode. Rather the mode switch is controlled entirely by the software through the use of vendor specific download commands and DMN.

Yet another embodiment of the invention provides a reusable and flexible code, which is handled at a very low level, thereby enabling development of new applications.

Another embodiment of the invention provides a robust application ensuring data integrity.

An embodiment of the present invention is a method for remotely upgrading the firmware of a target device using wireless technology comprising the steps of:
  establishing the connection needed for upgrading the target device;
  downloading the firmware image to the target device;
  signaling the completion of the download operation;
  rebooting the target device; and
  verifying the successful completion of the download operation.

According to an embodiment, the said establishing the connection needed for upgrading the target device comprises the steps of:

obtaining a first code of the device firmware in the target device, which contains the identification details of the firmware to be downloaded;

checking said first code at the host device;

sending a download command to the target device;

obtaining a response form the target device confirming its acceptance for the download.

According to an embodiment, the said downloading incorporates validation mechanism including checksums.

According to an embodiment, the said signaling is done by sending a second code to the target device.

According to an embodiment, the said verification is done by checking the presence of a second code in the target device.

According to an embodiment, the normal operation is resumed if verification of the second code is successful.

According to an embodiment, the said download operation is resumed if verification fails.

The said wireless technology includes Bluetooth technology.

An embodiment of the present invention further provides a system for remotely upgrading the firmware of a target device using wireless technology comprising:

a host device for sending the firmware required for upgradation; and a target device containing a first code and a second code wherein
i. said first code identifies details of the firmware; and
ii. said second code identifies the completion of the download operation when the firmware is successfully downloaded.

According to an embodiment, the host device includes a PC or a laptop.

According to an embodiment, the target device includes a Bluetooth enabled device for upgradation of said firmware.

According to an embodiment, the said wireless technology includes Bluetooth technology.

According to an embodiment, the said first code and said second code are Image Magic Number and Download Magic Number respectively.

An embodiment of the invention is a wireless device comprising
a first code identifying details of the firmware; and
a second code identifying the completion of the download operation when the firmware is successfully downloaded.

BRIEF DESCRIPTION OF THE DRAWINGS

One or more embodiments of the invention will now be explained in reference with the accompanying drawings.

DETAILED DESCRIPTION

Figure 1:
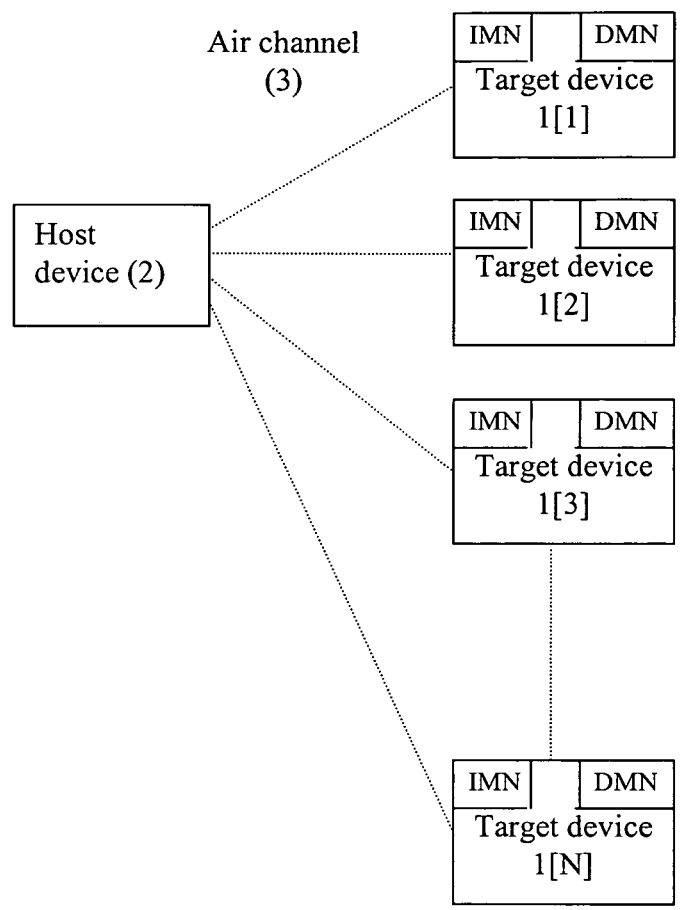
FIG. 1 represents the block diagram of the system in accordance with an embodiment of the invention.

FIG. 1 represents a block diagram of the system in accordance with an embodiment of the invention. It contains a host device (2) connected to the target devices 1[1:N]. The connecting channel between the devices is wireless (Bluetooth link) over which the data is communicated.

Figure 2:
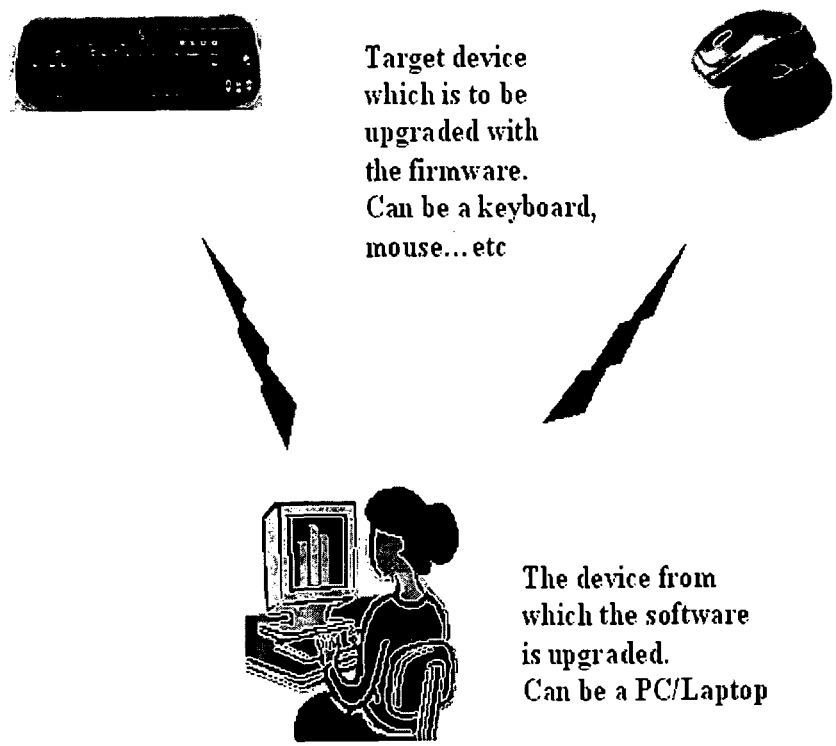
FIG. 2 represents an embodiment of the test setup.

FIG. 2 represents a concept used to upgrade the firmware of the target devices wirelessly according to an embodiment of the invention. It comprises a host device, which contains the firmware to be downloaded and one or more target devices, which are to be upgraded with the firmware. The host device can be a PC or a Laptop while the target devices can be any wireless device including Bluetooth enabled devices such as a keyboard, mouse, headsets and the like. The firmware is transmitted wirelessly via the air, which acts as a link or channel between two devices.

The target device can be in either of the following two modes: namely the download mode or the normal mode. In the download mode, the required firmware is downloaded to the target device, while in the normal mode, the device firmware executes the normal functionality of the device.

Figure 3:
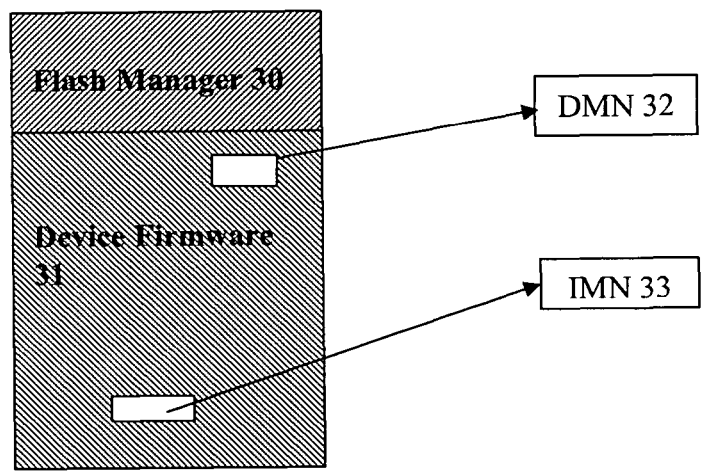
FIG. 3 represents the organization of the NVM in Target Device in accordance with an embodiment of the invention.

FIG. 3 represents the organization of the NVM 30 in a target device in accordance with an embodiment of the invention. At the manufacturing time, the downloader code as well as the device firmware 31 along with the Download Magic Number (DMN 32) is written in the NVM 30 of the target device. The downloader code is stored in the beginning of the NVM 30. For example, if the sector size in a typical NVM 30 is 64K, the downloader (which could be something like 180K) code will occupy 3 sectors. After reset the target device checks for the DMN 32, and if the DMN 32 is correct, it transfers the control to the device firmware 31.

The device firmware 31 contains a DMN 32 and an Image Magic Number (IMN) 33. It is the actual software on which the device runs, for e.g., for a keyboard, the software will scan the key matrix and report the scan codes.

The DMN 32 refers to the magic number that is written on the NVM 30 to indicate that the device firmware 31 present in the NVM is valid. Absence of this magic number 32 means that the device firmware 31 needs to be upgraded.

The IMN 33 contains the identification details of the firmware to be downloaded and is used to indicate whether the file to be downloaded has been built for the device that is being upgraded. It helps to prevent unexpected scenarios, for instance, where an end user may attempt to download onto the keyboard or on the mobile phone firmware meant for the mouse.

Figure 4:
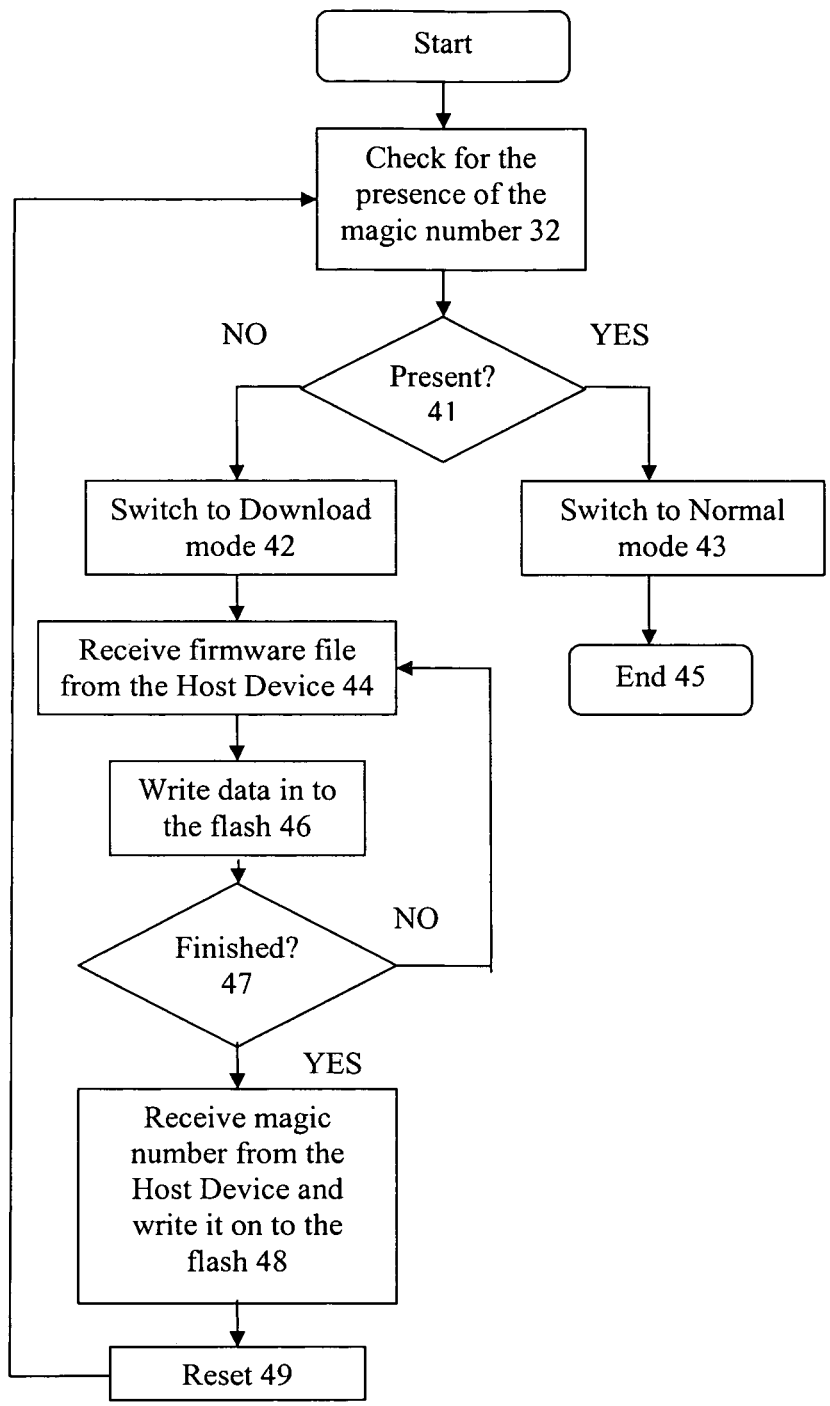
FIG. 4 represents the flowchart of the Target Device functionality in accordance with an embodiment of the invention.

FIG. 4 is a flowchart of the target device functionality according to an embodiment of the invention. At boot up, the downloader code of the target device checks for the presence of DMN 32, which is written at the time of manufacturing. If the DMN 32 is present, which means there is a valid device firmware 31 present in the NVM 30, the target device continues to work in the normal mode 43; but if the DMN 40 does not exist, the target device enters the download mode 42. The DMN 32 is absent basically when the device firmware is absent from the NVM of the target device.

The host device establishes connection with the target device to initialize downloading and sends the vendor specific download command. The vendor specific download commands are very specific to each manufacturer or vendor. The manufacturers define and use their own commands, apart from the standard commands that the device specification defines. Hence a vendor specific download command is used to inform the target device about the firmware upgrade.

The target device responds to the command. Once the host device gets the correct response to the download command from the target device, the host device starts sending the firmware file over the link to the target device. The target device receives the data 44 and writes it at an appropriate location 46 in its NVM 30 designated for the device firmware 31.

After the file transfer is finished 47, a checksum (e.g., 32 bits) calculated by the target device is verified to ensure complete data has been transferred. If the checksum is correct, the host device sends the DMN 32 to the target device, which writes the DMN 32 in the predefined location in the NVM 30; if the checksum is incorrect, the host device restarts with the download process.

Once the download operation is complete, the target device resets itself 49. After resetting, the target device checks for the presence of the DMN. If the DMN is present in the NVM, the target device enters the normal mode and starts working afresh.

Figure 5:
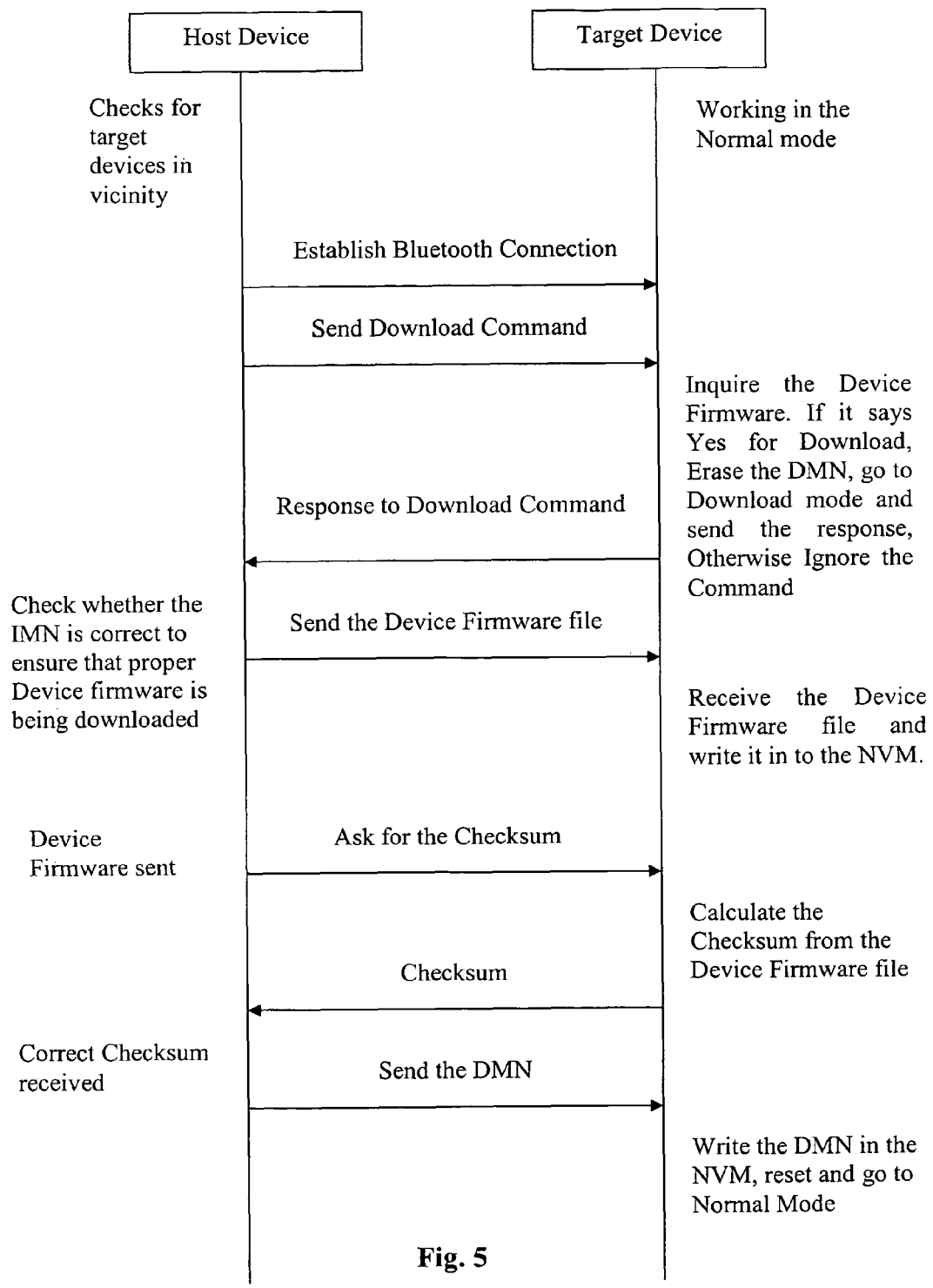
FIG. 5 represents the message sequence chart of the Download Protocol in accordance with an embodiment of the invention.

FIG. 5 is a message sequence chart of the download protocol between the host device and the target device according to an embodiment of the invention. When the host device wishes to upgrade target devices, it checks for the same in its vicinity. Having determined the target devices situated close to it, the host device establishes a connection with a specific target device. Then it sends a vendor specific download command to the target device.

The target device in turn inquires of the device firmware whether the firmware upgrade is acceptable or not. If the target device approves the download operation, it first erases the DMN 32 contained in the NVM 30 and then switches to the download mode. In case upgradation is not required or otherwise desired, the target device ignores the host device request.

On receipt of correct response to the download command from the target device, which authenticates the target device, the host device sends the device firmware file 31 to the target device over the link. Every firmware contains an IMN 33, in a pre-defined location. The host device, before sending the firmware over the wireless link, checks for the presence of the IMN containing details of the firmware to be downloaded. This is done to ensure that the target device is not upgraded with incorrect firmware. Once the target device receives the device firmware 31 in the download mode, it writes it into the NVM 30.

After the entire firmware file 31 is sent to the target device, the host device asks for the checksum (e.g., 32 bits) from the target device, the checksum being calculated by the target device from the device firmware file. The target device sends the checksum, which is compared with the checksum in the host device to verify whether complete data has been transmitted or not. If the checksum is correct, the host device sends the DMN 32, which is the last transmitted data by the host device. The target device writes the DMN into the NVM and resets itself.

After resetting, if the target device finds the valid DMN it resumes normal mode functioning; else it switches back to the download mode. The host device retransfers the required firmware.

The above-mentioned application ensures that only the intended target device is upgraded and not any other device in the vicinity, using a unique feature "download vendor specific command". Before any operation is done with the target device, the host device sends this vendor specific download command. If the target device is capable of responding to this vendor specific request, it responds to the command, else it will reject the request and the download operation will be aborted.

An embodiment of the invention can be worked out using the existing technology of Bluetooth protocol. The wireless nature of Bluetooth makes it easy to use for end users and facilitates device upgrade in-situ by the end user. There is no complexity/other technology involved, except for the vendor specific download command and the magic number. When Bluetooth protocol or other wireless protocols are used, no physical connections between the devices are made and the cost does not increase significantly. Thus the low cost protocol is easily used to upgrade such devices without the need of making complex interconnections.

The protocol is robust enough to ensure that if, for some reason, the download does not complete properly, the next time when the device powers up, it goes back to the download mode thereby providing guaranteed upgradation.

From the foregoing it will be appreciated that, although specific embodiments of the invention have been described herein for purposes of illustration, various modifications may be made without deviating from the spirit and scope of the invention.

What is claimed is:

1. A method implemented in a target device for upgrading a firmware in the target device, said method comprising:
    establishing a connection with a host device;
    sending a first code from the target device to the host device, said first code identifying firmware for the target device;
    downloading an updated firmware image for the identified firmware from the host device to the target device;
    sending, from the target device to the host device, a checksum computed from the downloaded firmware image;
    if the a correct checksum was sent, receiving from the host device a message containing a second code, said second code indicating to the target device that the download was successful; and
    writing the second code to a predetermined location in non-volatile memory of the target device and resetting the firmware in the target device.

2. The method of claim 1 wherein downloading an updated firmware image for the identified firmware from the host device to the target device comprises receiving a download command from the host device at the target device;
    and sending a download response to the host device from the target device to confirm acceptance by the target device of the download.

3. The method of claim 1 wherein downloading an updated firmware image for the identified firmware from the host device to the target device comprises downloading the updated firmware image to the target device over a wireless interface.

4. A target device containing firmware, said target device comprising:
    a communication interface for communicating with a host device;
    a processor configured to:
    establish a connection with the host device;
    send a first code from the target device to the host device, said first code identifying firmware for the target device;
    download an updated firmware image for the identified firmware from the host device to the target device over the communication interface;
    send a checksum computed from the downloaded firmware image from the target device to the host device over the communication interface;
    if a correct checksum is sent, receive a message containing a second code to the target device over the communication interface, said second code indicating to the target device that the download was successful; and write the second code to a predetermined location in a non-volatile memory of the target device and resetting the firmware in the target device.

5. The target device of claim 4 wherein the processor is further configured to download receive a download command from the host device; and send a download response to the host device to confirm acceptance by the target device of the download.

6. The target device of claim 4 wherein the communication interface comprises a wireless interface.

* * * * *